W. E. KEOPPLE.
EXPANSION PLUG GAUGE.
APPLICATION FILED SEPT. 15, 1920.

1,408,808.

Patented Mar. 7, 1922.

INVENTOR,
William E. Keopple,
BY
Howard S. Smith,
ATTORNEY

UNITED STATES PATENT OFFICE.

WILLIAM E. KEOPPLE, OF DAYTON, OHIO.

EXPANSION-PLUG GAUGE.

1,408,808.  Specification of Letters Patent.  Patented Mar. 7, 1922.

Application filed September 15, 1920. Serial No. 410,391.

*To all whom it may concern:*

Be it known that I, WILLIAM E. KEOPPLE, a citizen of the United States, residing at Dayton, in the county of Montgomery and State of Ohio, have invented certain new and useful Improvements in Expansion-Plug Gauges, of which the following is a specification.

The principal object of my invention is to provide an expansion plug gauge for the accurate measurement of one or more holes in a piece or structure without the necessity of employing a special size gauge for each hole. The adjustability of my gauge adapts it for such close work as that which pertains to holes that vary in size but one thousandth of an inch. Its range, on the other hand, is from zero to one thirty second of an inch.

Another object of my invention is the provision of a gauge in which plugs of various sizes are adapted to be inserted to accommodate different sized work, with means for preventing these plugs from dropping out of the gauge after they have been placed therein.

It is still another object of my invention to provide for the gauge, a longitudinally movable graduated scale that is at right angles to the inserts to indicate in thousandths of an inch the distance that they are moved.

Other important and incidental objects will be brought out in the following specification, and particularly set forth in the subjoined claims.

Figures 1, 2:
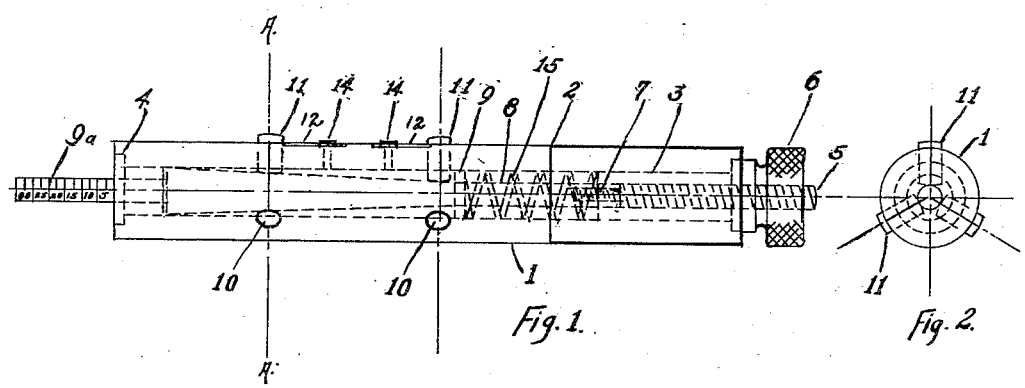
Figures 3, 4:
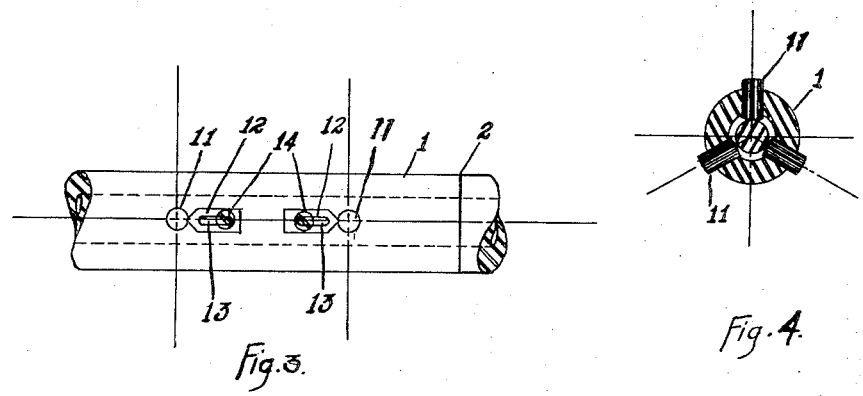

In the accompanying drawings, Figure 1 is a side elevational view of my expansion plug gauge, with the operating parts within the barrel shown in dotted lines. Figure 2 is an end view of the same. Figure 3 is a side elevational view of the rear middle portion of the gauge, showing the means employed to hold the inserts therein. And Figure 4 is a cross sectional view taken on the line A—A of Figure 1.

Throughout the specification and drawings, similar reference characters denote corresponding parts.

Referring to the accompanying drawings, the numeral 1 designates a barrel whose outside periphery is preferably undercut one sixty fourth of an inch from a circular line 2 thereon to the rear end of the gauge. The portion of its periphery between the line 2 and the front end of the gauge is employed to measure the distance between holes.

Pressed into the front end of the barrel 1 is a bushing 3, while into its rear end there is pressed a bushing 4. Loosely projecting through the longitudinal bore in the bushing 3 is a screw 5 which receives on its front end, beyond the barrel 1, a thumb nut 6. By turning the latter clockwise, the screw may be drawn outwardly for a purpose soon to be described.

The screw 5 has a reduced inner end 7 which is threaded into the front uniform diameter portion of a shaft 8 which has a longitudinal movement within the barrel 1. From a collar 9 mounted on the shaft 8 a short distance from its front end, said shaft tapers rearwardly to a point near the end of the barrel, terminating in a reduced part which projects outwardly through the bushing 4. Provided in the outer end of the reduced portion of the rear end of the shaft 8, are graduations $9^a$, each one of which is adapted to register with the outer face of the bushing 4, for a purpose to be hereinafter described. (See Figure 1.)

Provided in the wall of the barrel 1 adjacent the tapered portion of the shaft 8, are two series of radially disposed holes 10, there being preferably three holes in each series. Adapted to be inserted in each one of these holes 10 for a longitudinal movement therein, is a radial plug or insert 11. Each one of these plugs has a slightly rounded head whose central point is adapted to bear against the wall of the hole to be measured. The inner end of each one of these plugs is also rounded, so that its central point will bear against the periphery of the tapered portion of the shaft.

For the purpose of preventing the plugs 11 from dropping out of the holes 10, and still permitting their longitudinal movement therein, the following means are provided. Adapted to enter a slight axial depression in the outer periphery of the upper portion of each plug 11, is the pointed nose of a slide 12. Each slide contains a longitudinal slot 13 through which there loosely passes into the barrel 1, a screw 14. After a plug 11 has been inserted in a hole 10, the screw 14 nearest the latter is loosened so that the slide 12 through which said screw passes, may be moved longitudinally to project its nose into the slight vertical depression in the periphery of the plug. The screw is then turned to hold the slide firmly in its adjusted position.

Encircling the shaft 8 between the collar 9 and the bushing 3, is a spring 15, adapted to be compressed when the nut 6 is turned to draw the shaft outwardly, for the purpose of returning said shaft to its normal position when the screw is turned in the opposite direction. (See Figure 1.)

In operation, the barrel 1 is inserted in a hole to be measured. The thumb nut 6 is then turned to draw the shaft outwardly a sufficient distance to cause its tapered portion to force the plugs 11 outwardly into engagement with the wall of the hole. The gauge will then be held firmly in the hole until the desired measurements are taken. A separate gauge is not required for every hole, since plugs 11 of a size to accommodate a particular hole may be readily inserted in the barrel.

After the barrel has been inserted in a hole and the plugs 11 pressed into firm engagement with the wall of the latter, a reading is taken on the graduated end of the shaft 8. For example, if the shaft should be drawn into the barrel 1 a distance which brings the line adjacent the graduation marked 5, into registration with the bushing 4, then the diameter of the hole measured would be 505 thousandths of an inch. If the line indicating the half space between 5 and 10 were brought flush with the outer face of the bushing, then the diameter of the hole measured 507.5 thousandths.

For quick work, after the gauge is inserted into a hole, the graduated end of the shaft 8 may be pressed inwardly with the thumb until the plugs 11 are in engagement with the wall of that hole, after which a reading is taken. The gauge is then inserted in another hole and operated in the same manner, and so on until the last hole is measured. It is thus possible with my gauge to measure a great number of holes accurately in a short time.

Having described my invention, I claim:

1. In a device of the type described, the combination with a barrel having radially disposed holes therein, of a longitudinally movable member in said barrel, having a tapered portion, plugs adapted to be moved outwardly by the tapered portion of said member, through the radially disposed holes in said barrel, and means for moving said member longitudinally, from each end of said barrel.

2. In a device of the type described, the combination with a barrel having radially disposed holes therein, of a longitudinally movable member in said barrel, having a tapered portion, insertible plugs adapted to be moved outwardly by the tapered portion of said member, through the radially disposed holes in said barrel, and a graduated outer end on said member by which it may be moved longitudinally.

3. In a device of the type described, the combination with a barrel having radially disposed holes therein, of a bushing in one end of said barrel, a shaft having a reduced portion movable through said bushing, a tapered portion on said shaft, insertible plugs adapted to be moved outwardly by the tapered portion of said shaft, through the radially disposed holes in said barrel, and graduations on the reduced portion of said shaft adapted to be brought into registry with the outer face of said bushing during the inward movement of the shaft, to indicate the size of the hole measured by said plugs.

4. In a device of the type described, the combination with a barrel having radially disposed holes therein, of a bushing in each end of said barrel, a shaft longitudinally movable therein, projecting through one of said bushings, a screw connected to the other end of said shaft projecting through the other bushing, a thumb nut on said screw, a tapered portion on said shaft, an enlargement at the base of said tapered portion, a spring between said enlargement and the adjacent bushing, and insertible plugs adapted to be moved outwardly by the tapered portion of said shaft, through the radial holes in the barrel, against the compression of said spring, when the shaft is moved forwardly by said nut.

In testimony whereof I have hereunto set my hand this 14th day of September, 1920.

WILLIAM E. KEOPPLE.

Witness:
HOWARD S. SMITH.